United States Patent [19]

Marrelli et al.

[11] Patent Number: 5,779,035
[45] Date of Patent: Jul. 14, 1998

[54] REUSABLE PLASTIC CONTAINERS AS PACKAGING MATERIAL FOR DISPOSABLE PLASTIC GARBAGE BAGS CONTAINED THEREIN AND METHOD OF PACKAGING WITH REUSABLE PLASTIC CONTAINERS AS PACKAGING MATERIAL

[75] Inventors: John C. Marrelli, 2761 Dow Ave., Tustin, Calif. 92680; Gary L. Rutledge, Parker, Tex.

[73] Assignee: John C. Marrelli, Tustin, Calif.

[21] Appl. No.: 571,919

[22] PCT Filed: Aug. 11, 1995

[86] PCT No.: PCT/US95/10205

§ 371 Date: Apr. 9, 1996

§ 102(e) Date: Apr. 9, 1996

[87] PCT Pub. No.: WO96/06013

PCT Pub. Date: Feb. 29, 1996

[51] Int. Cl.[6] .......................... B65D 43/16; B65D 69/00; B65D 85/69
[52] U.S. Cl. .......................... 206/233; 206/390; 206/407; 206/409; 220/23.4; 220/254
[58] Field of Search .......................... 220/407, 403, 220/23.2, 23.4, 23.6, 524, 254, 337, 23.83, 334; 206/233, 597, 407, 409, 554, 499, 390

[56] References Cited

U.S. PATENT DOCUMENTS

| D. 284,728 | 7/1986 | Trivison . | |
|---|---|---|---|
| 1,472,088 | 10/1923 | Puckett . | |
| 3,194,426 | 7/1965 | Brown, Jr. | 220/23.4 |
| 3,195,272 | 7/1965 | Mosher et al. . | |
| 3,300,082 | 1/1967 | Patterson . | |
| 3,322,262 | 5/1967 | Puente . | |
| 3,645,284 | 2/1972 | Krezanoski et al. | 220/254 X |
| 3,760,975 | 9/1973 | Nilsson . | |
| 3,987,829 | 10/1976 | Leone . | |
| 4,155,479 | 5/1979 | Liechti et al. | 220/23.4 |
| 4,171,047 | 10/1979 | Doyle et al. | 206/409 X |
| 4,416,373 | 11/1983 | DeLarosiere | 220/23.4 X |
| 4,462,507 | 7/1984 | Margulies | 206/409 X |
| 4,467,939 | 8/1984 | Warwick . | |
| 4,473,165 | 9/1984 | Lentjes . | |
| 4,717,018 | 1/1988 | Sacherer et al. . | |
| 4,723,693 | 2/1988 | DeCoster | 220/335 X |
| 4,754,898 | 7/1988 | Britt et al. | 220/255 |
| 4,756,424 | 7/1988 | Schwartz | 206/499 X |
| 4,850,486 | 7/1989 | Neibaur | 206/409 X |

(List continued on next page.)

Primary Examiner—Allan N. Shoap
Assistant Examiner—Niki M. Kopsidas
Attorney, Agent, or Firm—Lowe Hauptman Gopstein & Berner

[57] ABSTRACT

A multi-purpose container (10) is provided. The container has a lid (14) having an edge (60) and a ridge (54) rising from a top surface of the lid (14). The multi-purpose container also has a container portion (12) defining an opening (25) for the container (10). The container portion (12) includes a base (16) having a recess (82) defined in one surface (80) of the base (16). The container portion also includes first (22) and second (24) sides joined to the other surface of the base (16). Each side (22 & 24) has a lid channel (48) along a top inside edge (46) for receiving the lid's edge. The back (18) is joined to the base (16) and sides (22 & 24) and has a back ridge (72) rising from an outside surface (70) and a lid channel (61) along its top inside edge for receiving the lid's edge. The container portion (12) also includes a front (20) joined to the base (16) and sides (22 & 24) and has a front ridge (28) rising from its outside surface. The lid's edge slides into the lid channel of the sides (48) and back (61) so as to secure the lid (14) in the container portion's opening (25). Additionally, the lid's ridge (54) can interlock with the base recess (82) of another similarly constructed container and the front ridge (28) can interlock with the back ridge (72) of another similarly constructed container.

8 Claims, 14 Drawing Sheets

U.S. PATENT DOCUMENTS

| | | |
|---|---|---|
| 4,955,505 | 9/1990 | Battaglia . |
| 4,982,863 | 1/1991 | Skillius . |
| 5,000,340 | 3/1991 | Leggio . |
| 5,022,197 | 6/1991 | Ponsi . |
| 5,054,617 | 10/1991 | Young et al. . |
| 5,064,088 | 11/1991 | Steffes . |
| 5,109,978 | 5/1992 | Cawley . |
| 5,158,191 | 10/1992 | Douglas et al. ............... 220/23.4 X |
| 5,267,669 | 12/1993 | Dixon et al. ................... 220/466 X |
| 5,413,235 | 5/1995 | Kenevan ....................... 220/23.4 X |
| 5,533,621 | 7/1996 | Schoal, Jr. ........................ 206/409 |

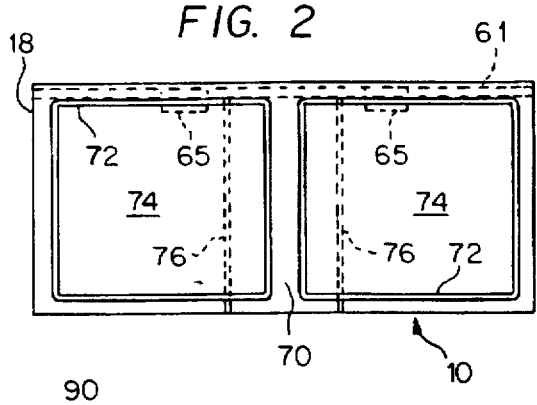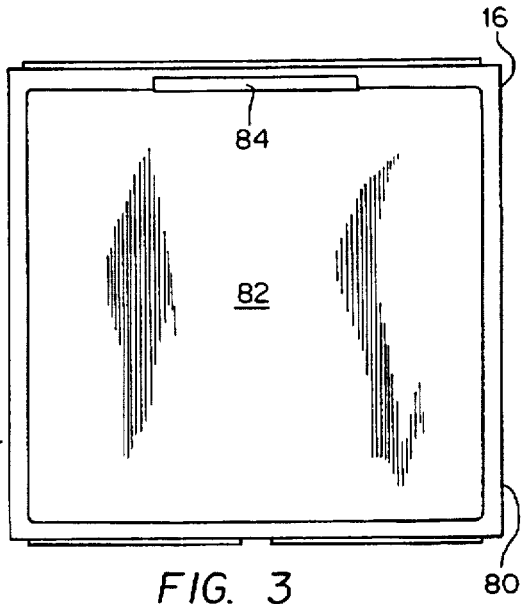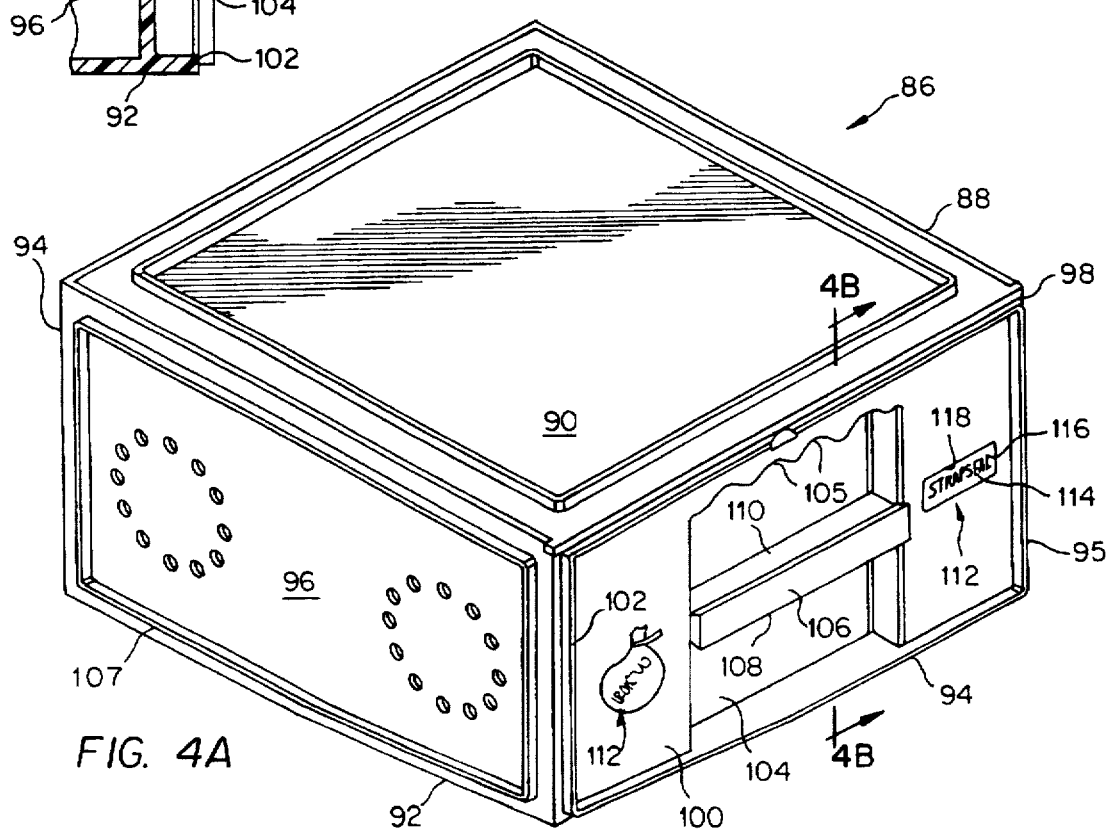

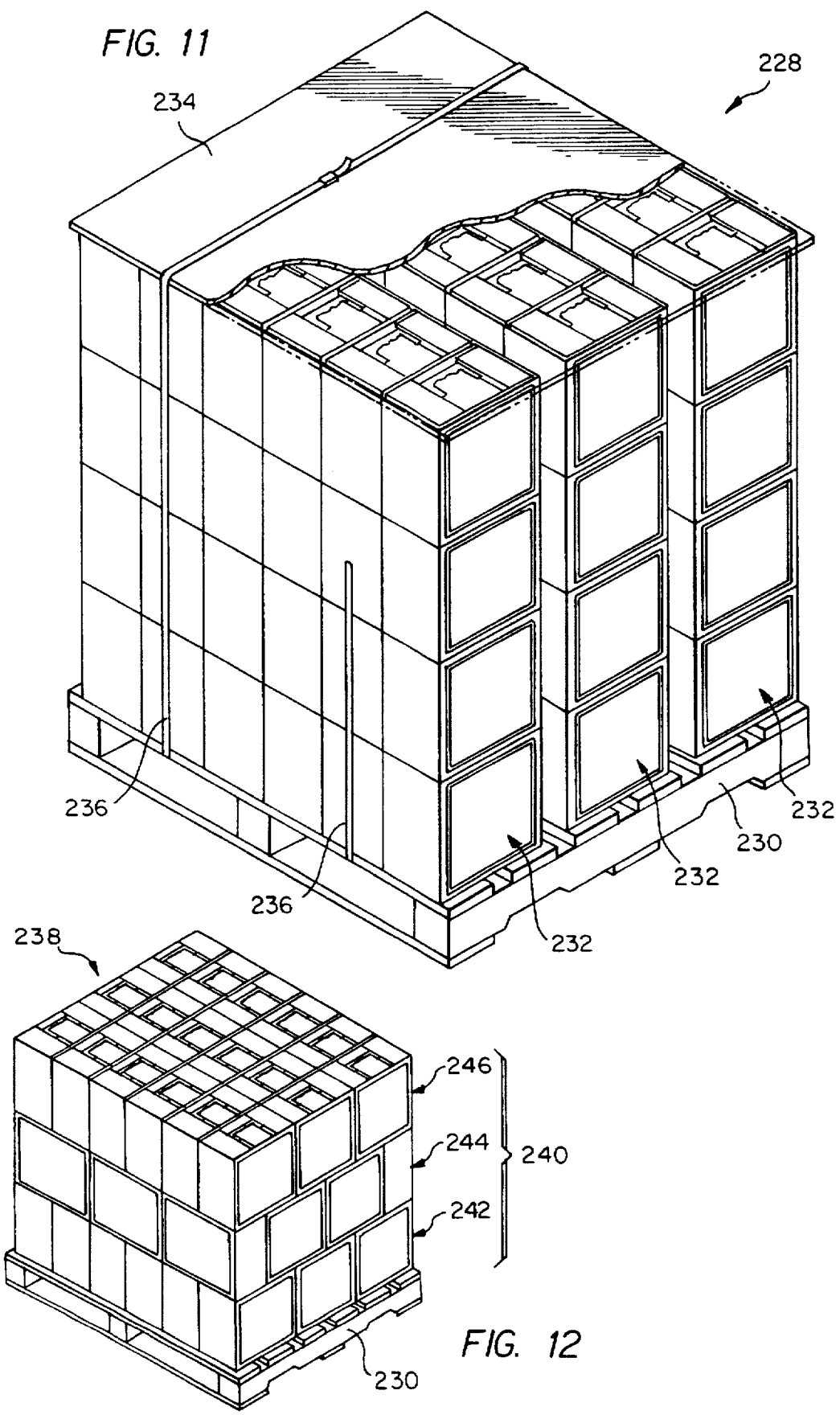

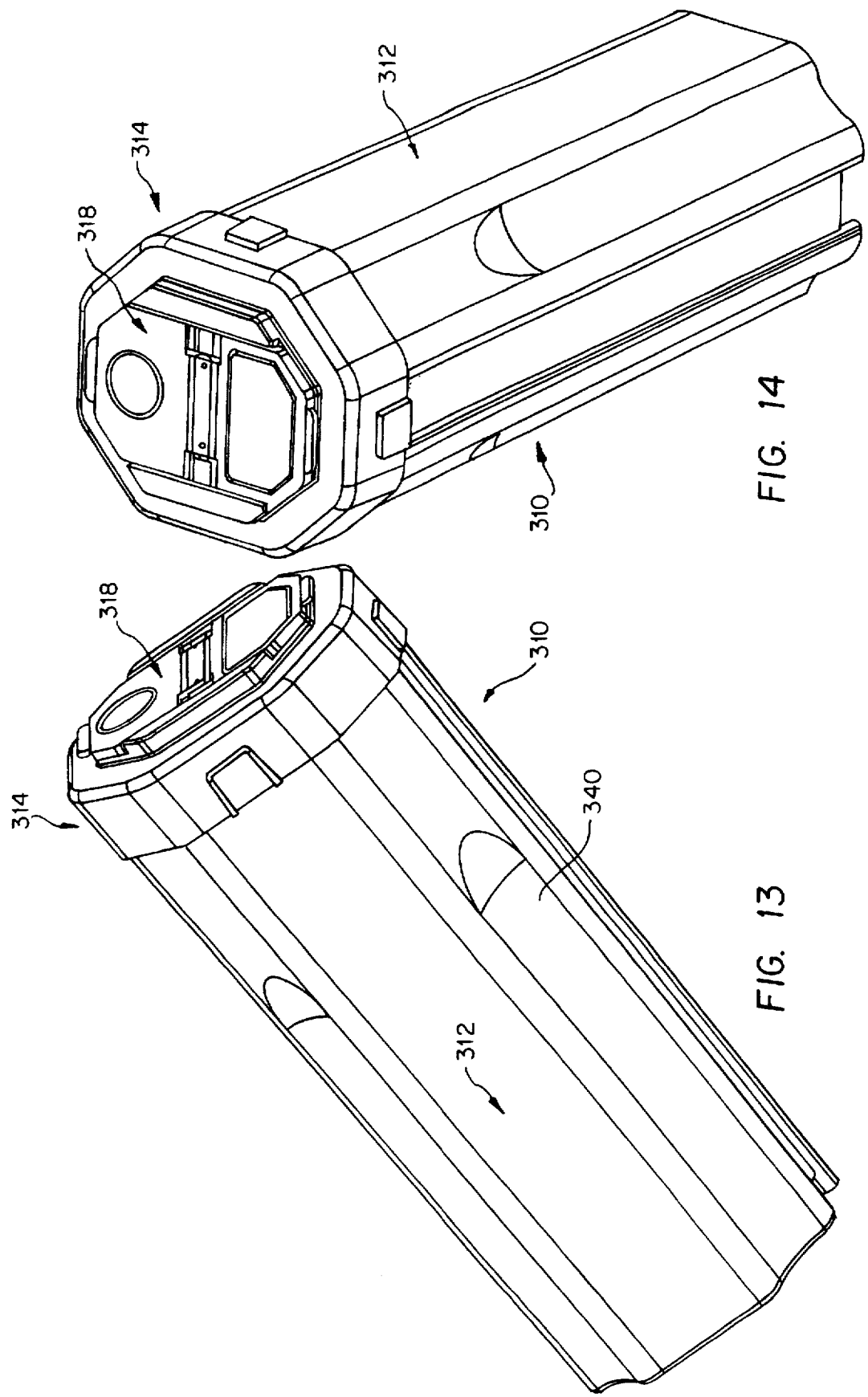

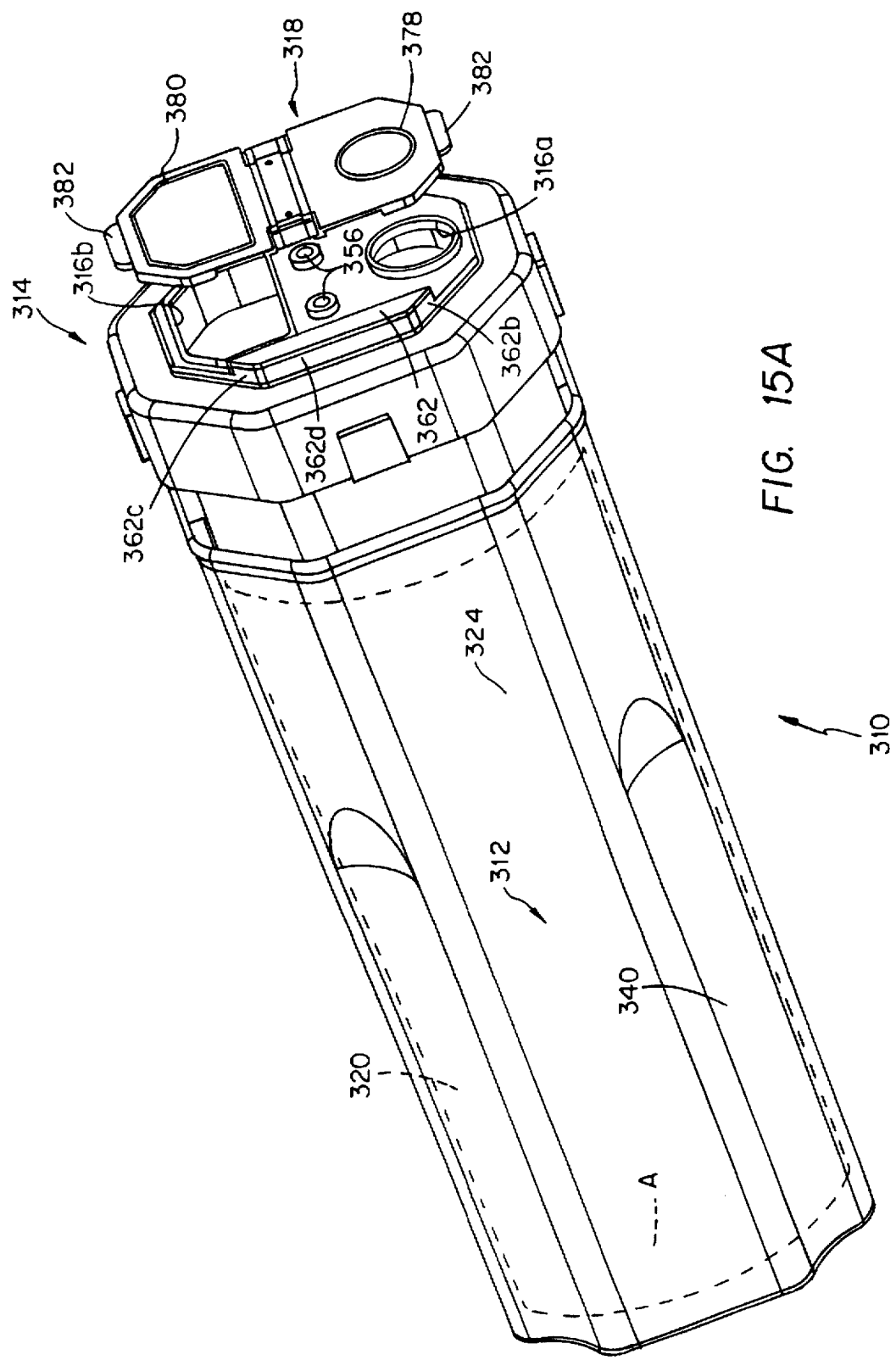

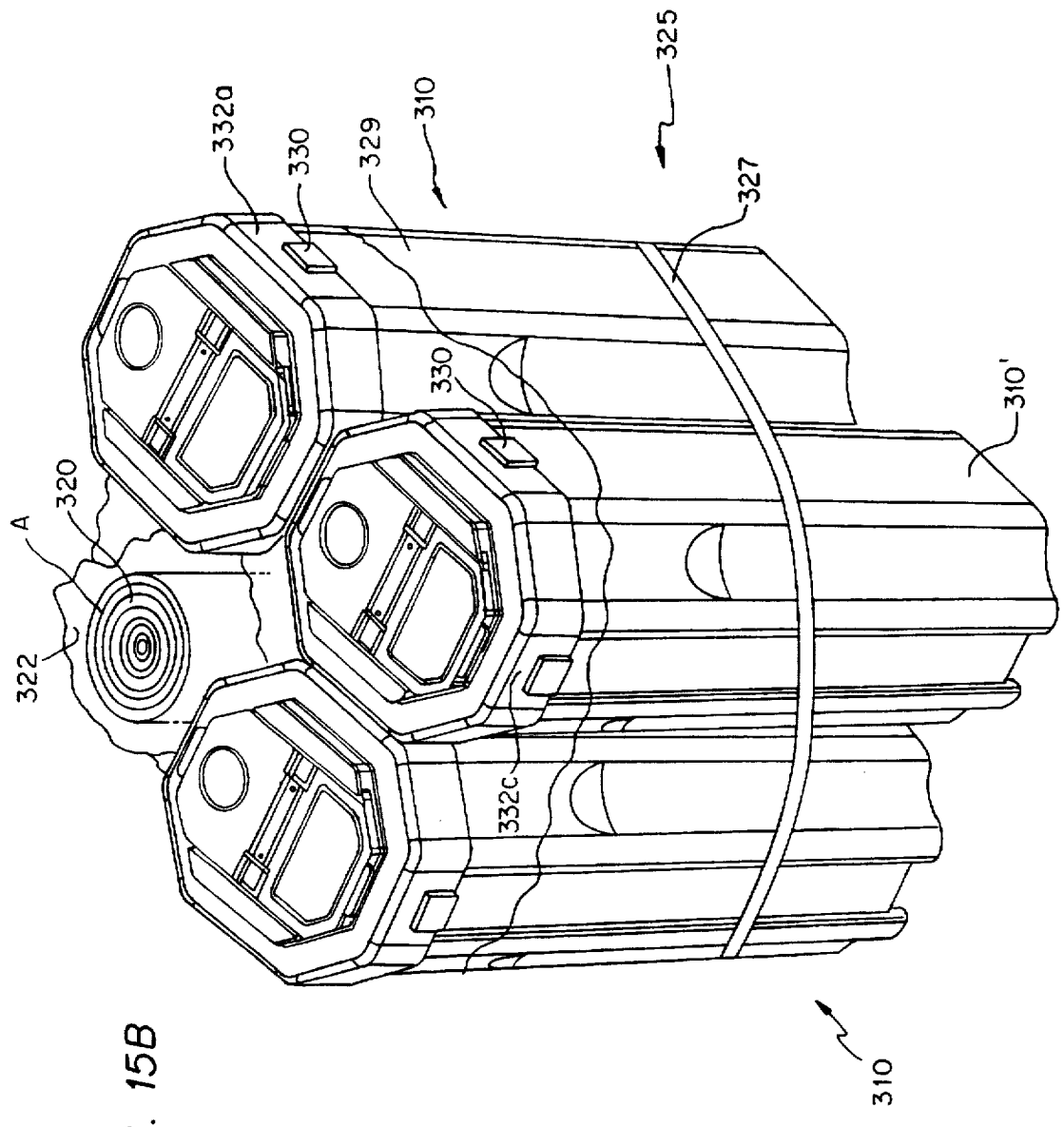

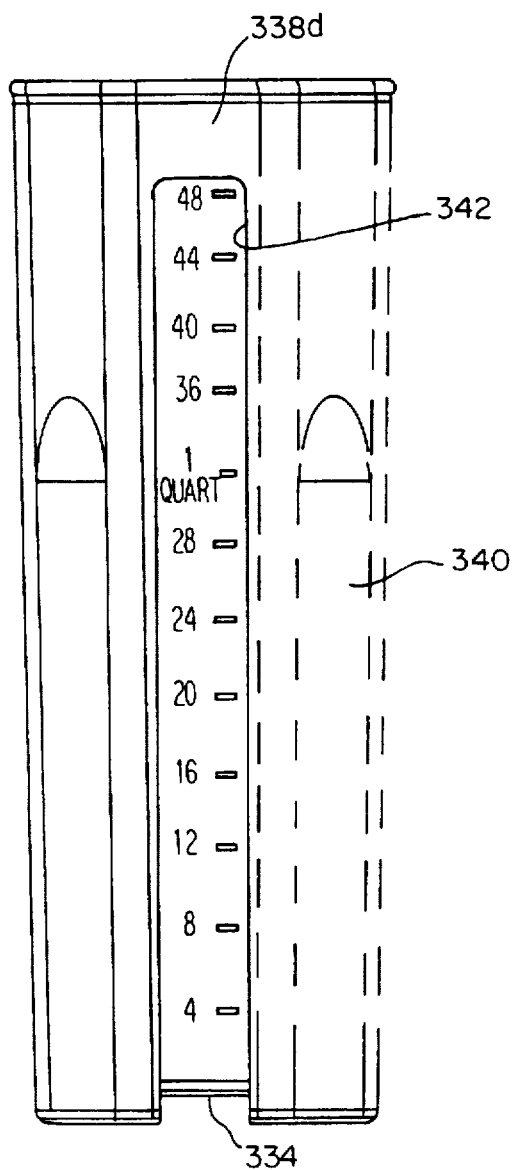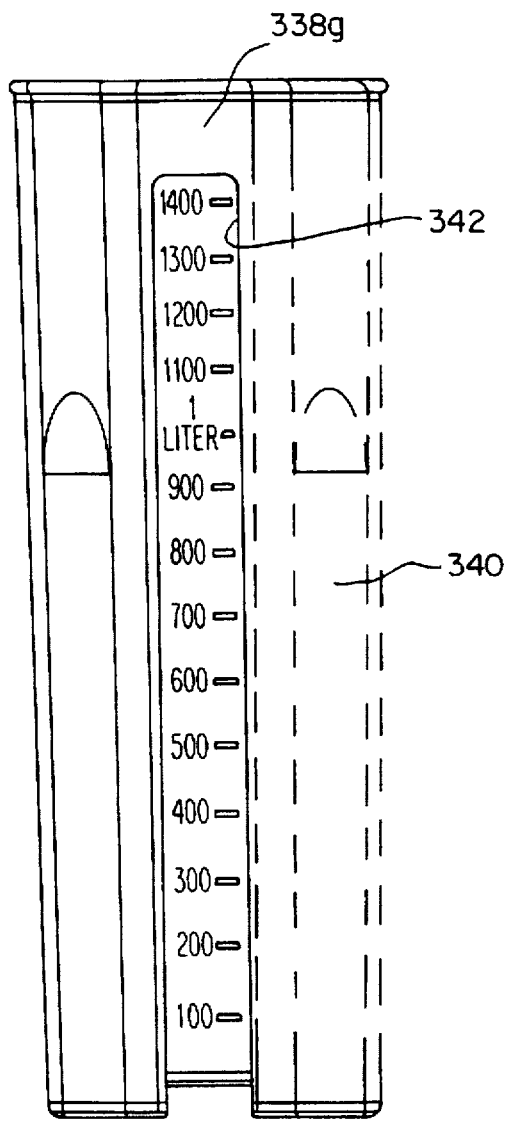
FIG. 16A
FIG. 16B

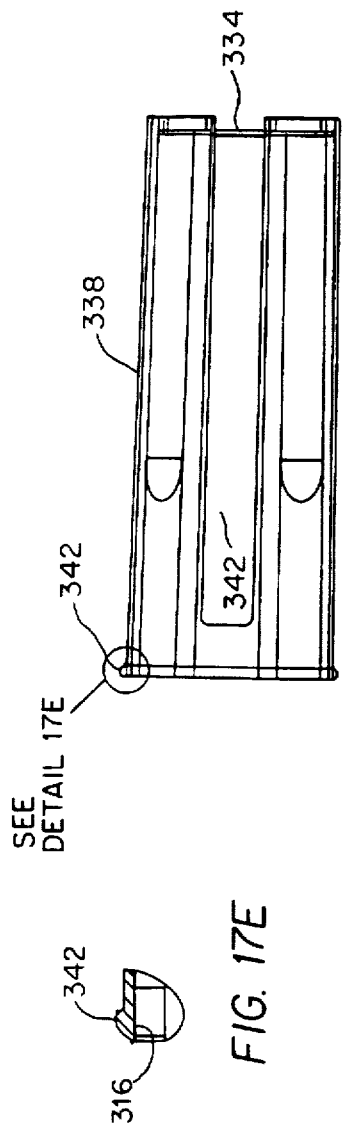
FIG. 17C
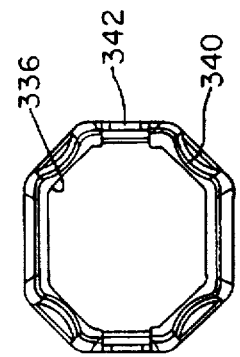
FIG. 17F
FIG. 17E
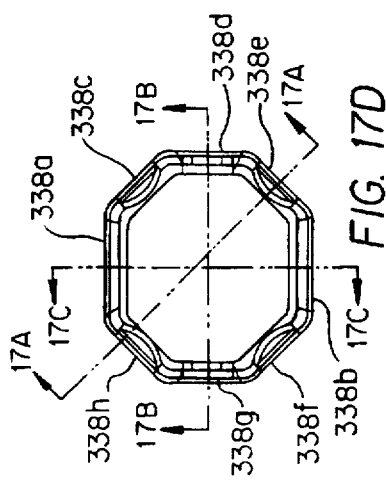
FIG. 17D
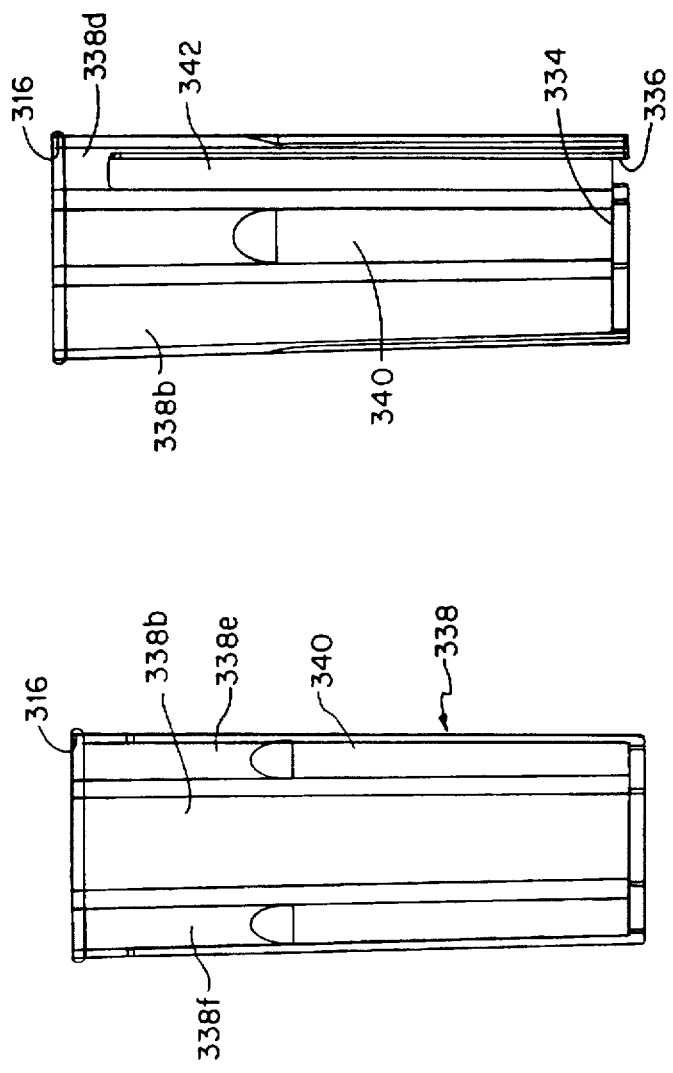
FIG. 17A
FIG. 17B

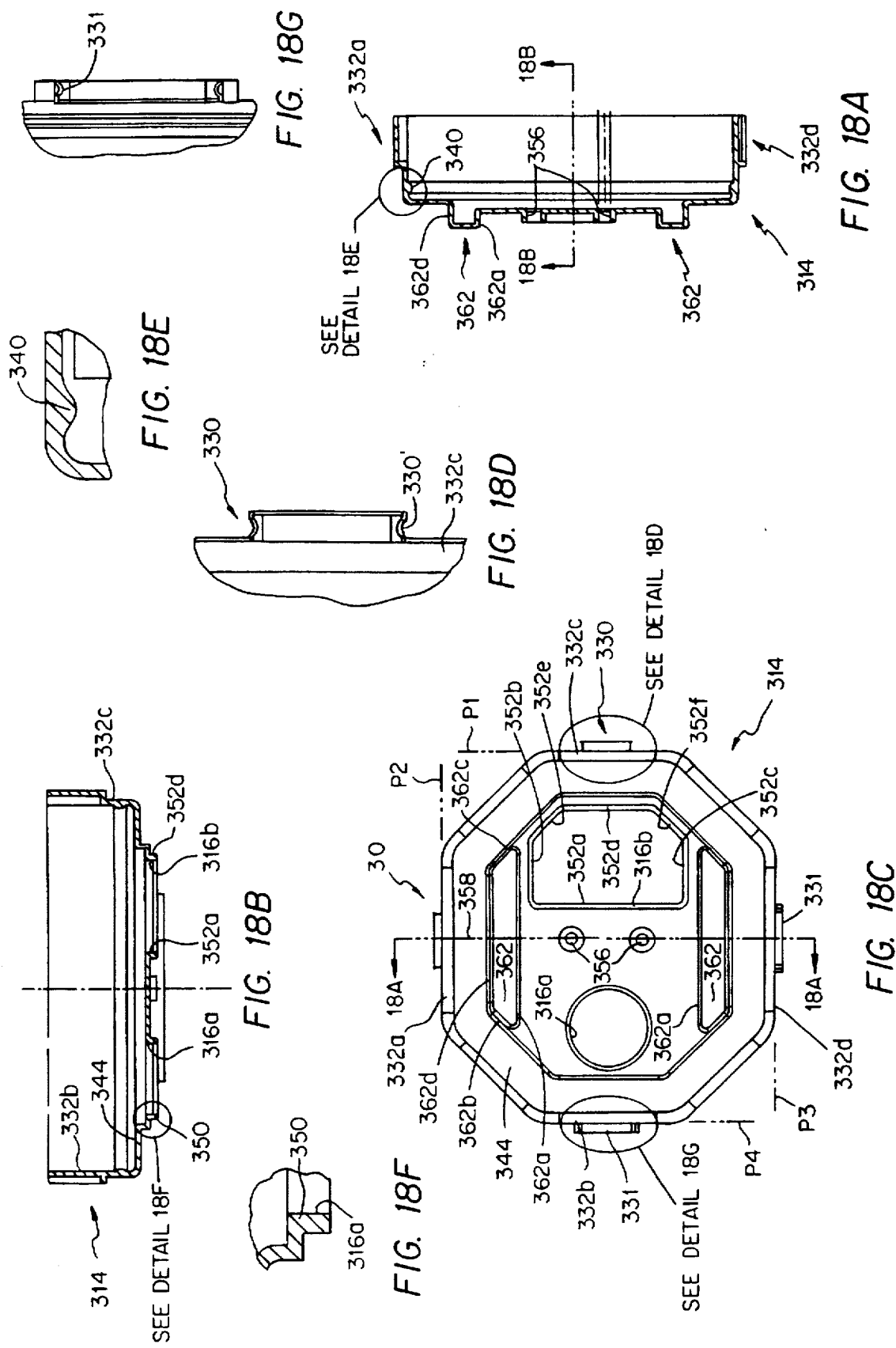

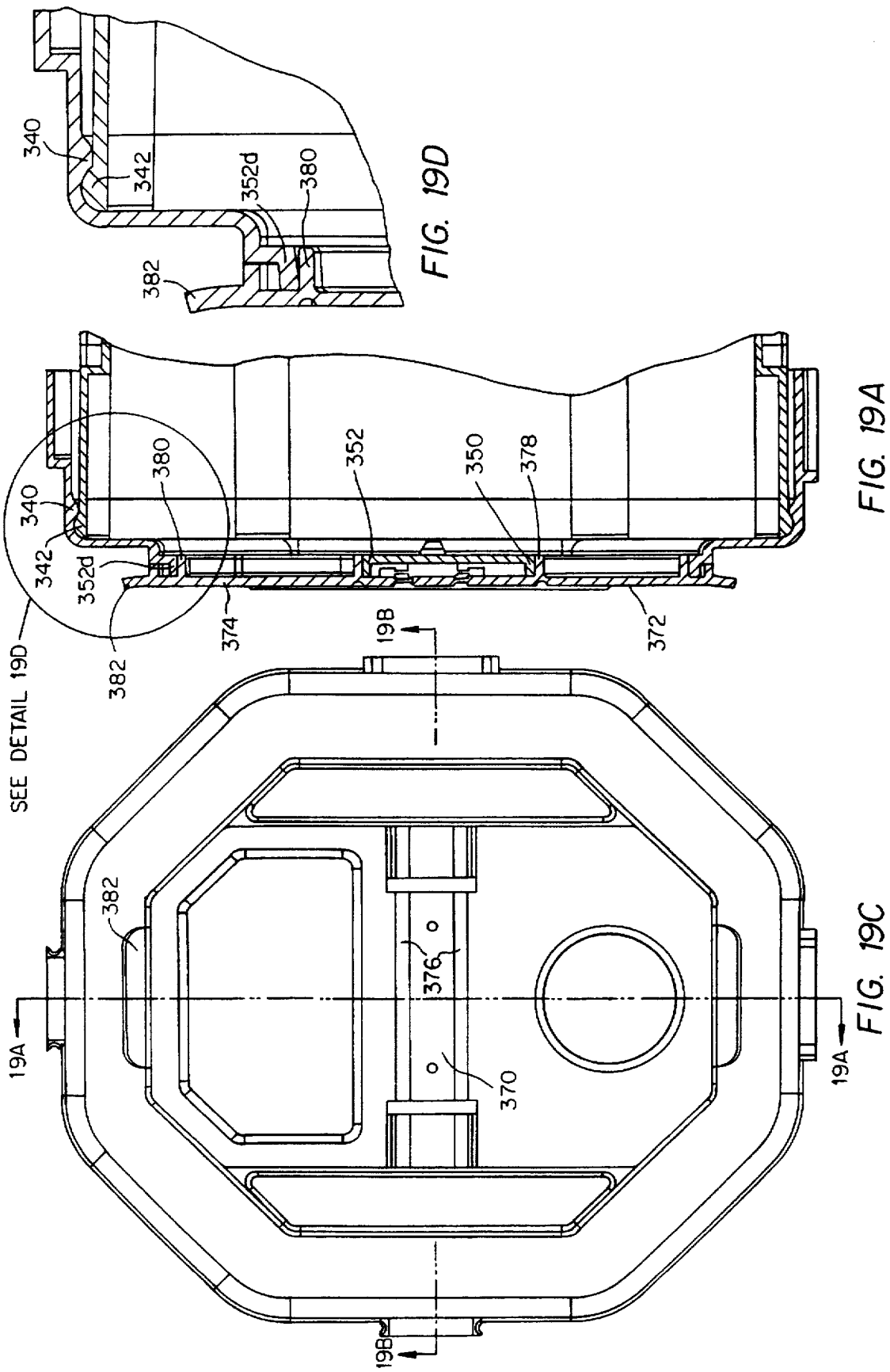

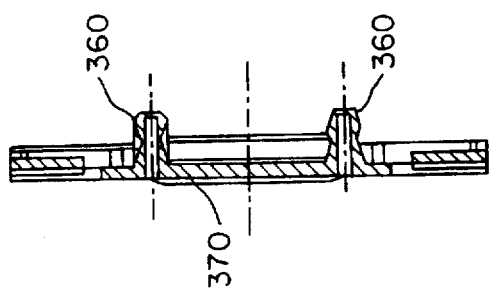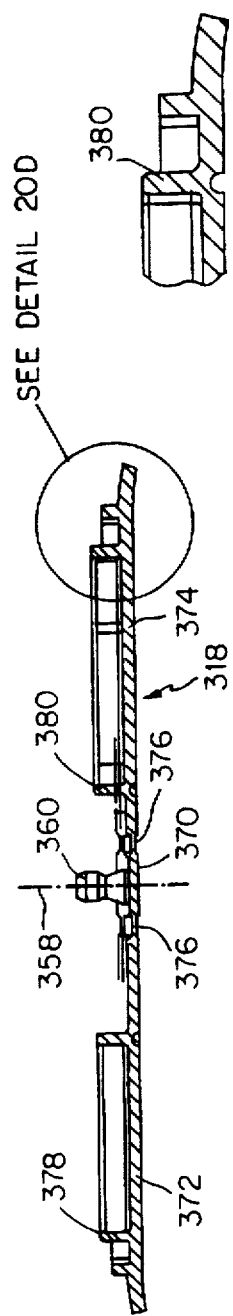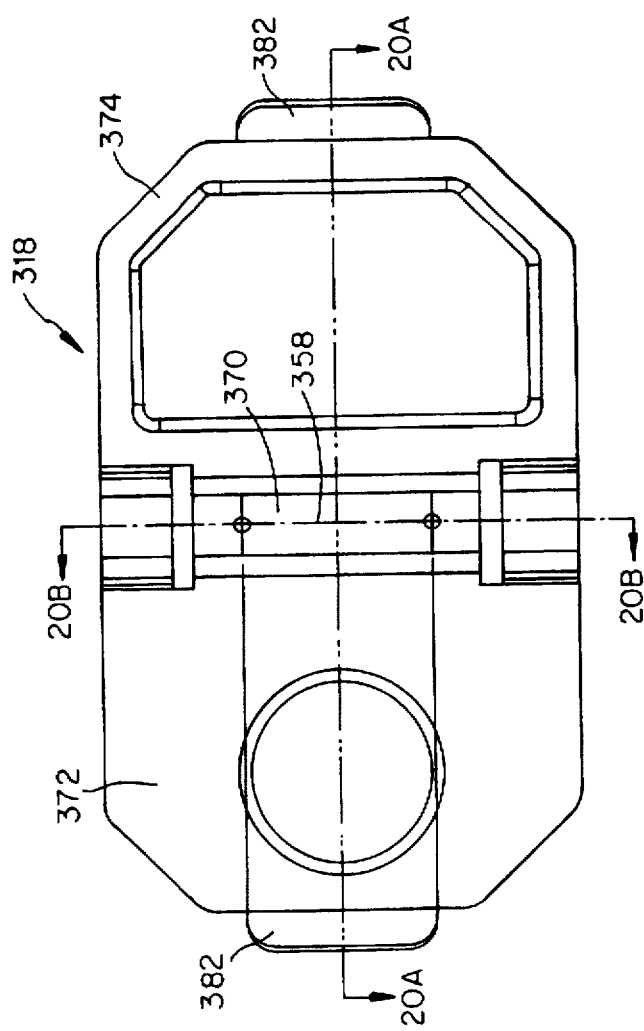

REUSABLE PLASTIC CONTAINERS AS PACKAGING MATERIAL FOR DISPOSABLE PLASTIC GARBAGE BAGS CONTAINED THEREIN AND METHOD OF PACKAGING WITH REUSABLE PLASTIC CONTAINERS AS PACKAGING MATERIAL

TECHNICAL FIELD

This invention relates in general to the field of shipping, storage, and display containers, and more particularly, to a multi-purpose stackable, interlocking shipping, storage, and display container. More specifically, the present invention relates to packaging and shipping material for disposable plastic garbage bags, and, more particularly, to the retail and wholesale packaging of plastic garbage bags in reusable plastic containers.

BACKGROUND OF THE INVENTION

In the material handling industry, there is a need for a container that can be used for shipping, storing, and displaying various types of materials. Currently, material is shipped in a first container, often stored in a second container, and then displayed in a third container. The cost of each container adds to the expense of the material and also creates waste that must be disposed of. Moving the material between containers also adds additional cost to the material itself.

Previously developed containers often do not provide for stable stacking. In order to secure a number of containers during shipment, it is often necessary to wrap the containers several times in a plastic wrap. Once the material reaches its destination, the plastic wrap is removed and must be disposed of.

Presently available stackable containers generally may be stacked in only one direction. Generally, the bottom of one container will mate with the top of another. This may not always be acceptable. It may be desirable to stack containers front to back for certain applications. This is not provided for in prior art containers.

Disposable plastic garbage bags represent one type of material that is shipped in a container. As is well known, large quantities of disposable plastic garbage bags are commonly used in home and office environments for the collection and storage of trash. Predetermined quantities of these bags are typically sold in cardboard packaging, or other types of packaging material, all of which are disposable and of little or no use once they have been emptied of their contents. Therefore, such packaging creates disposal concerns which may have an adverse environmental impact, and also raises costs.

It is accordingly one object of the present invention to package plastic bags, preferably plastic garbage bags, in reusable containers.

Another object is to package, display and sell plastic trash bags or other products in reusable containers that do not require modification and are multi-functional in use once the bags or other goods are removed after purchase.

Still another object is to enable manufacturers of plastic products to utilize one of their products as packaging material for a second plastic product preferably manufactured by the same manufacturer.

SUMMARY OF THE INVENTION

In accordance with the present invention, a multi-purpose shipping, storage, and display container is provided that substantially eliminates problems associated with prior containers.

One aspect of the present invention provides a multi-purpose container having a lid and container portion. The lid has an edge and a ridge rising from a top surface of the lid. The container portion defines an opening for the container and includes a base, two sides, a back, and a front. The base has a recess formed in one of its surfaces. The sides include first and second sides joined to the base with each side having a lid channel along its top inside edge for receiving the lid's ridge. The back is joined to the base and sides and has a back ridge rising from an outside surface and a lid channel along a top inside edge for receiving the lid's first edge. The container portion's front is joined to the base and sides and has a front ridge rising from its outside surface. The lid's edge slides into the lid channel of the sides and back so as to secure the lid in the container portion's opening. Additionally, the lid's ridge will interlock with the base recess of a similarly constructed container, and the front ridge will interlock with the back ridge of another similarly constructed container.

The present invention provides a technical advantage of a container that is suitable for shipping, storing and displaying material. The present multi-purpose container is stackable and may be interlocked with multiple other containers.

The present container is also suitable for displaying the material within the container. Upon delivery at its destination, the present container can be used to display the material it holds without requiring transfer to a separate product display package. This provides a technical advantage of minimizing the handling costs to the material that are generally passed onto the end-user or consumer of the material. Using the multi-purpose container of the present invention for shipping, storing, and displaying material also provides a technical advantage of minimizing waste otherwise generated as the material is transferred between containers.

Another technical advantage of the present container is its low cost and lightweight. The present invention may have a latching lid that may be made tamper proof providing a technical advantage of securing the material in the container safely. The present container may also include a recessable handle that provides technical advantages of easy handling when used but does not interfere when not in use.

Yet another technical advantage of the present multi-purpose container is that it may be formed from recyclable material. The present container may be formed using standard plastic manufacturing processes. Additionally, the present invention reduces the amount of plastic wrap required when several of the present containers are in shipment.

Another technical advantage of the present multi-purpose container is that it may have after market use by the consumer. For example, the present container can be used to ship, store, and display produce. After removing the produce from the container, the consumer can use the present multi-purpose container for storing various household items.

In a broad context, therefore, the invention concerns the use of a first product as packaging for and shipment of a second product. The first product is a 'stand alone' saleable product having functional and structural utility separate and apart from the functional and structural utility of the second product.

In accordance with another preferred embodiment of the invention there is provided a reusable plastic container as packaging for and shipping of a plurality of plastic trash bags disposed within the container. Both the container and the bags are sold as a unit at a point of purchase display.

After purchase, the bags may be removed to enable use of the container for storage of liquids or dry foods, or a sundry of other items, and optionally for freezer storage and measuring.

In a different sense, the present invention is directed to the combination of a reusable plastic container including an open top container body and a main lid reattachably secured to selectively close the open top. A dry product is disposed within the reusable container wherein the latter constitutes packaging for the dry product at a point of purchase. Both the reusable container acting as packaging for the dry product, and the product itself are sold as a unit.

In yet another sense, a further preferred embodiment of the present invention concerns a reusable container comprising a container body and a main lid detachably secured to close an open end of the container body. The main lid is formed with at least one pour opening. An auxiliary closure is preferably detachably secured to the main lid to selectively cover the pour opening. A locking tab is formed on a side wall portion of at least one of the main lid and container body and a locking recess is formed on another side wall portion of at least one of the main lid and container body. Mating engagement of the locking tab of one reusable plastic container within a locking recess of another identical reusable plastic container enables adjacent containers to interlock in side-by-side display.

In this further preferred embodiment, the main lid includes first and second differently sized dispensing openings. The auxiliary closure includes a pair of closure portions at opposite ends thereof and a hinge portion at a center location. Thinner connecting webs attach the closure end portions to the center hinge portion to define flexure zones enabling each closure portion to independently manually pivot into and out of closing contact with the associated pour opening. This arrangement facilitates pourability at different flow rates as a result of the different size openings. Preferably, the hinge portion includes connecting hinge formations that snap-fit into openings formed in the main lid or are otherwise attached for connecting the auxiliary closure to the lid.

The side walls of the container body may be tapered to facilitate nesting with a similar container. Certain ones of the side walls of the container body can be provided with longitudinal recesses to create finger-gripping depressions. Other side walls of the container body can be provided with further longitudinal recesses to facilitate sliding of an inner container from an outer container when in the nested position.

The container body bottom wall is preferably provided with stacking formations capable of interfitting with complementary stacking formations formed in the top surface of the main lid of an adjacent below container to facilitate stacking of like containers.

A method of packaging a dry product is also disclosed. In accordance with the method of the invention, a reusable container functions as packaging for the product. The reusable container has a separate multi-functional use apart from its existence as packaging. Both the reusable container and the product packaged within are sold as a unit at a point of wholesale or retail purchase. After sale to the ultimate user, the product can either be dispensed as needed from the container, such as through one of the pour openings. Preferably, however, the product is removed from the container to enable the latter to now be used multi-functionally, e.g., for storage of other products, dry or liquid; as a juice or liquid dispenser, storage container for foods, storage container for hardware, office supplies, etc.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 2 provides a back view of one configuration of the container of the present invention;

FIG. 3 illustrates a view of one embodiment of the present container from the perspective of the base;

FIG. 4A shows a perspective view in elevation of another embodiment of the present multi-purpose container;

FIG. 4B provides in part a side view in section of the multi-purpose container of the present invention having a solid molded handle;

FIG. 11 illustrates in elevation an application of several of the present multi-purpose containers in a shipping system;

FIG. 12 illustrates in elevation another application of several of the present multi-purpose containers in a shipping system;

FIGS. 13 and 14 are perspective view illustrations of a reusable plastic container in accordance with a further preferred embodiment of the present invention;

FIG. 15A is an exploded perspective view of the container of FIG. 13 with the container body and main lid and auxiliary closure detached from each other;

FIG. 15B is a perspective view of a packaged array of containers of the type depicted in FIG. 13, for use as packaging material for plastic garbage bags;

FIGS 16A and 16B are side elevational views of the container body of FIG. 13;

FIG. 17A is a sectional view of the container body taken along the line 17A—17A of FIG. 17D;

FIG. 17B is an elevational view of the container body taken along section lines 17B—17B of FIG. 17D;

FIG. 17C is an elevational view of the container body taken along section lines 17C—17C of FIG. 17D;

FIG. 17D is a top plan view of the container body of FIG. 17B when viewed with the main lid removed;

FIG. 17E is a detailed view of a sealing bead formed in the container body open end;

FIG. 17F is a bottom plan view of the container body of FIG. 17A;

FIG. 18A is a sectional view of the main lid taken along line 18A—18A of FIG. 18C;

FIG. 18B is a sectional view of the main lid taken along line 18B—18B of FIG. 18A;

FIG. 18C is a top plan view of the main lid;

FIG. 18D is a detailed sectional plan view of a male locking tab formed on the main lid;

FIG. 18E is a detailed sectional view of a rib used to create snap-fitting engagement between the main lid and container body open end;

FIG. 18F is a detailed view of one of the pour openings formed in the main lid;

FIG. 18G is a detailed sectional plan view of a female locking recess formed in the main lid;

FIG. 19A is a sectional view taken along the line 19A—19A of FIG. 19C to depict the main lid and auxiliary closure operatively attached to the container body;

FIG. 19C is a top plan view of the main lid with the auxiliary closure in fully attached and closed positions;

FIG. 19D is a detailed sectional view depicting the manner of sealing attachment between the auxiliary closure with the main lid and the main lid with the container body open end;

FIG. 20A is a sectional view taken along the line 20A—20A of FIG. 20C depicting longitudinal cross-sectional view details of the auxiliary closure;

FIG. 20B is a sectional view taken along the line 20B—20B of FIG. 20C;

FIG. 20C is a top plan view of the auxiliary closure; and

FIG. 20D is a detailed sectional view of a sealing portion of the closure end.

BEST MODE FOR CARRYING OUT THE INVENTION

Preferred embodiments of the present invention are illustrated in FIGS. 1A through 20D, like numerals being used to refer to like and corresponding parts of the various drawings.

Figure 1A:
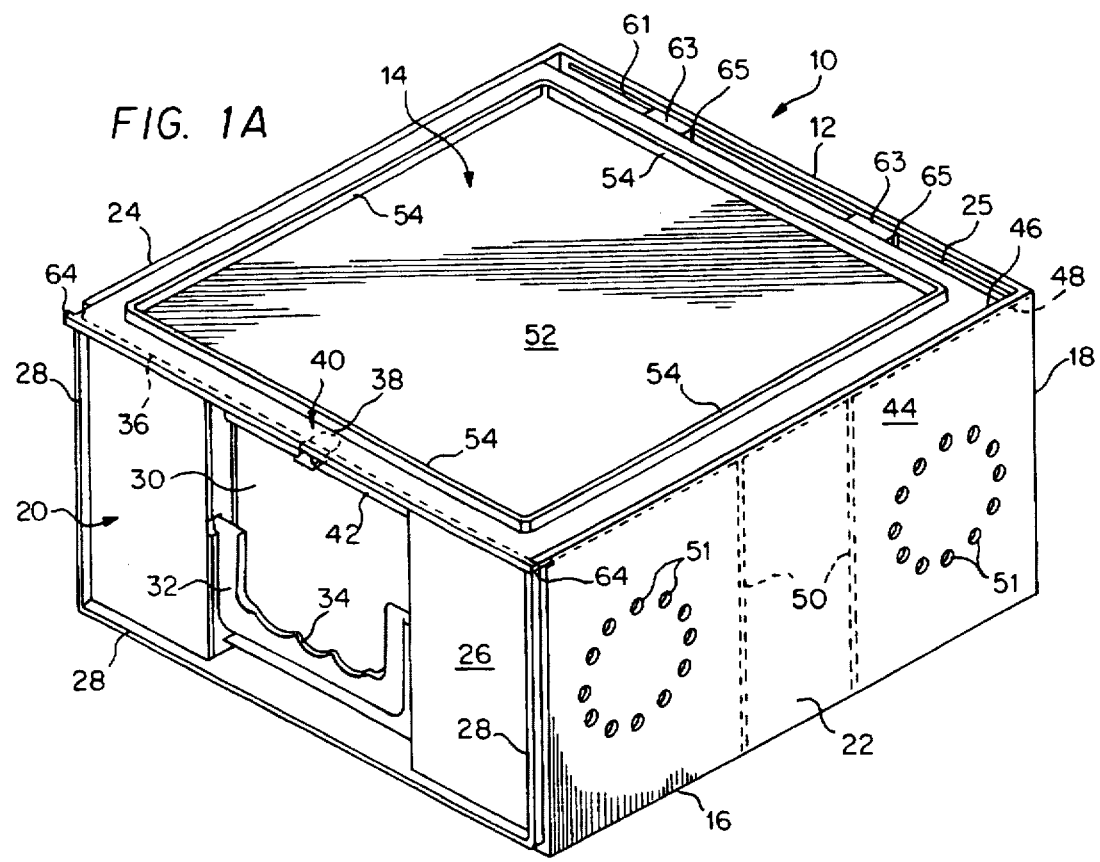
FIG. 1A shows a perspective view in elevation of one embodiment of the present multi-purpose container.

FIG. 1A shows multi-purpose container 10 having container portion 12 and lid 14. Container portion 12 includes base 16, back 18, front 20, and sides 22 and 24 defining opening 25 in container portion 12. The thickness of lid 14, base 16, back 18, front 20, and sides 22 and 24, is generally uniform throughout container 10. Each of the elements of container 10 may be formed from plastic, such as high or low density polyethylene, polypropylene, polystyrene, or other material or blends of materials suitable for injection or other molding processes. The material that forms container 10 must be stiff and rigid, but not brittle. The plastic used to form container 10 may be recycled plastic. Additionally, the plastic may be fiber filled. The plastic used to form container 10 may also be clear, opaque, translucent, or of various colors. Container portion 12 may be formed by a plastic injection molding or blow-molded process in a single step, or alternatively, each of the pieces of container portion 12 can be formed separately and later joined together by appropriate processing.

Front 20 includes front panel 26 having raised front ridge 28 around the perimeter of front panel 26. It is noted that while ridge 28 is depicted in FIG. 1A as a thin ridge, a wider ridge can be used without departing from the concepts of the present invention. Front panel 26 is slightly shorter than sides 22 and 24 and couples to base 16 and sides 22 and 24. Front panel 26 may have recess 30 formed in its central section. Within recess 30 may be handle 32. In the embodiment of container 10 of FIG. 1A, handle 32 includes handle body 34, it being understood that various shapes for handle body 34 may be used without departing from the concepts of the present invention. Alternatively, handle 32 may be a recess formed in front panel 26.

An important feature of front 20 is that handle 32 can be stowed below the surface of front panel 26 in recess 30 when container 10 is in shipping or storage. By placing handle 32 in recess 30, the handle remains out of the way when not in use and allows front 20 of container-10 to mate with back 18 of a second container similar to container 10. Additional configurations for handle 32 are described in discussions relating to FIGS. 4A, 5, 6 and 8.

Located approximately in the center of top edge 36 (shown in dotted line format in FIG. 1A) of front 20 may be female portion 38 of latch 40. Female portion 38 cooperates with male portion 41 of latch 40 to secure lid 14 in opening 25 of container portion 1Z. Female portion 38 may be reinforced with reinforcement body 42 providing additional strength to latch 38.

Sides 22 and 24 are generally parallel with one another and include side panel 44. Each side panel 44 couples to base 16, front 20, and back 18. The outside surface of side panel 44 may be generally smooth and lacking of any protuberances.

Located along top inside edge 46 of each side 44 is lid channel 48 (shown in dotted line format on side 22 in FIG. 1A). Lid channel 48 is sized to engage the edge of lid 14 therein. Sides 22 and 24 may also include support members 50 (shown in dotted line format in FIG. 1A) located on the inside of container portion 12. Support members 50 provide additional strength to sides 22 and 24. Sides 22 and 24 may also have vents 51 that provide air flow into and out of container 10. vents 51 may be particularly desirable when container 10 is used to ship produce and other perishable materials. It is noted that vents 51 may be formed in all surfaces of container 10 and in a variety of configurations, shapes, and sizes, and are not limited to those shown in the Figures.

Lid 14 of container 10 includes top surface 52 having ridge 54 raised above surface 52 formed around the outside of lid 14. In the embodiment of the present invention shown in FIG. 1A, lid ridge 54 is a single continuous ridge matching the general shape of lid 14. It is noted that lid ridge 54 is not limited to this configuration. Lid ridge 54 may have several geometric shapes, such as, for example, four squares, without departing from the concepts of the present invention. Ridge 54 could also have more thickness than shown in FIG. 1A without departing from the concepts of the present multi-purpose container. Lid ridge 54 mates with base 16 of another container 10. In some embodiments of the present multi-purpose container, a removable label ma be placed on top surface 52 of lid 14 that graphically depicts and/or describes the material within container 10. Alternatively, when it is desirable to display the material while in container 10, lid 14 can be made from a clear material.

Figure 1B:
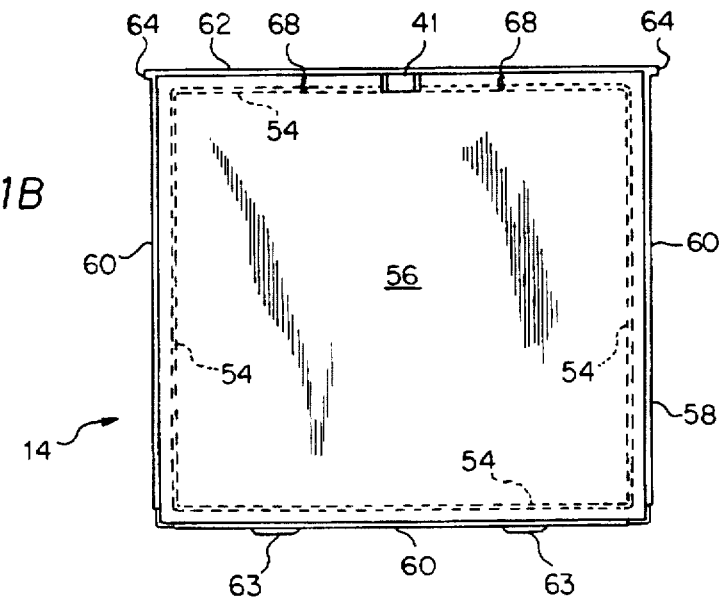
FIG. 1B depicts an inside view of an embodiment of the lid for the container of the present invention.

FIG. 1B provides a view of inside of lid 14 in FIG. 1A. On underside 56 of lid 14 and along the outside edge 58 of lid 14 is lid engagement ridge 60. Lid engagement ridge 60 is sized to fit in side lid channel 48 formed in sides 22 and 24 and in back lid channel 61 (FIG. 1A and 2). Ridge 60 may also include locking tabs 63 on back edge 57 that slide into matching slots 65 in back lid channel 61. Front edge 62 of lid 14 includes stops 64 at either end of front edge 62. Stops 64 are larger than lid engagement ridge 60 and prevent lid 14 from being inserted too far into opening 25 of container portion 12. Front lid edge 62 of lid 14 also includes male portion 66 of latch 40. Located on either side of male portion 66 of front lid edge 62 may be protuberances 68. Protuberances 68 fit over front top edge 36 of front 20 when lid 14 is fully disposed in opening 25 of container portion 12. Protuberances 68 and latch 40 help secure lid 14 closed in container portion 12 of container 10.

FIG. 2 shows a rearward-looking view of container 10. Back 18 of container 10 includes back panel 70 with engagement ridges 72 rising therefrom. In the embodiment depicted in FIG. 2, engagement ridges 72 are in the form of two squares 74. It is noted that engagement ridge 72 of back 18 is not limited to this configuration. Engagement ridges 72 of back 18 are formed to mate within front ridge 28 of front 20.

Back panel 70 may also include supports 76 (shown in dotted line format in FIG. 2) formed on the inside of container portion 12 for providing additional strength to back 18. Back panel 70 also includes back lid channel 61 sized to receive lid engagement ridge 60 of lid 14. Channel 61 may include slots 65 for receiving tabs 63 on ridge 60.

FIG. 3 provides a view of container 10 of FIG. 1A from the perspective of base 16. Base 16 includes base panel 80 having recess 82 formed therein. Base recess 82 is sized to receive lid ridge 54 when two of containers 10 of the present invention are stacked one upon another. Base recess 82 may also include cutout 84 that may be grasped to provide easier handling of container 10. In some embodiments of the present multi-purpose container, a removable label may be placed on base recess 82 of base 16 that graphically depicts and/or describes the material within container 10.

Based upon the above description of container 10, its operation is straightforward. Loading container 10 is easier compared to prior art containers because container 10 provides a four-wall, solid structure for receiving many types of material. Once the desired material is placed within container portion 12, lid 14 may be secured over opening 25 of container 10 by aligning lid engagement ridge 60 of lid 14 with lid side channels 48 in sides 22 and 24. Lid 14 may then be slid into opening 25 until lid engagement ridge 60 fills back lid channel 61 of back 18. At this point, protuberances 68 will slide over top edge 36 of front 20 and male portion 66 will be engaged in female portion 38 of latch 40 securing lid 14 in opening 25 of container portion 12.

FIG. 4A shows container 86 having container portion 88 and lid 90. Container portion 88 includes base 92, back 94, front 95, and sides 96 and 98. The thickness of lid 90, base 92, back 94, front 95, and sides 96 and 98 is generally uniform throughout container 86. Container 86 of FIG. 4 shows an alternate configuration for the present multi-purpose container of the present invention. In particular, front 95 includes an alternate embodiment for the handle that may be used with the present container.

Front 95 includes front panel 100 having raised front ridge 102 around the perimeter of front panel 100. Front panel 100 is slightly shorter than sides 96 and 98 and couples to base 92 and sides 96 and 98. Front panel 100 may have recess 104 formed in its central section. Within recess 104 is handle 106. Recess 104 also includes finger grips 105 that are sized to receive fingers when container 86 is lifted. In the embodiment of FIG. 4A, handle 106 is a solid tapered body having wide section 108 at its exterior and narrow section 110 where handle 106 couples to front panel 100 in recess 104. Additional detail on handle 106 may be found in discussions relating to FIG. 4B.

Side 96 of container 86 has ridge 107 rising therefrom, and side 98 would have a similar ridge. By including ridges on sides 96 and 98, the present multi-purpose container can be side-to-side interlocked with a similarly constructed container. It is appreciated that a convention for the ridges must be established so that interlocking is achieved. For example, the ridge on side 96 of all similarly constructed containers can be sized to mate within the ridge on side 98 of all similarly constructed containers. By this way, the present multi-purpose container can interlock face-to-back, lid-to-bottom, and side-to-side with similarly constructed containers.

FIG. 4A demonstrates some additional features of the present multi-purpose container. Container 86 includes markings 112 that can be repositional adhesive markings or alternatively can be snap-in inserts. For example, marking insert 114 can be formed of a solid body portion 116 that snaps into opening 118 formed in front panel 100. This allows the present container to be personalized by the user as desired. Additionally, markings 112 can be identical or different as shown in FIG. 4A.

FIG. 4B shows a cross-sectional view of handle 106 of FIG. 4A. In particular, FIG. 43 shows that handle 106 is completely contained within recess 104 in front panel 100. Wide section 108 of handle 106 is generally even with the surface of front 95 and narrow section 110 couples to front panel 100 within recess 104. It is noted that the shape of handle 106 is not limited to that shown in FIG. 4B as various shapes can be used without departing from the inventive concepts of the present invention. Handle 106 can be coupled to front 95 by molding, heat staking, or form fixturing processes.

Figure 5:
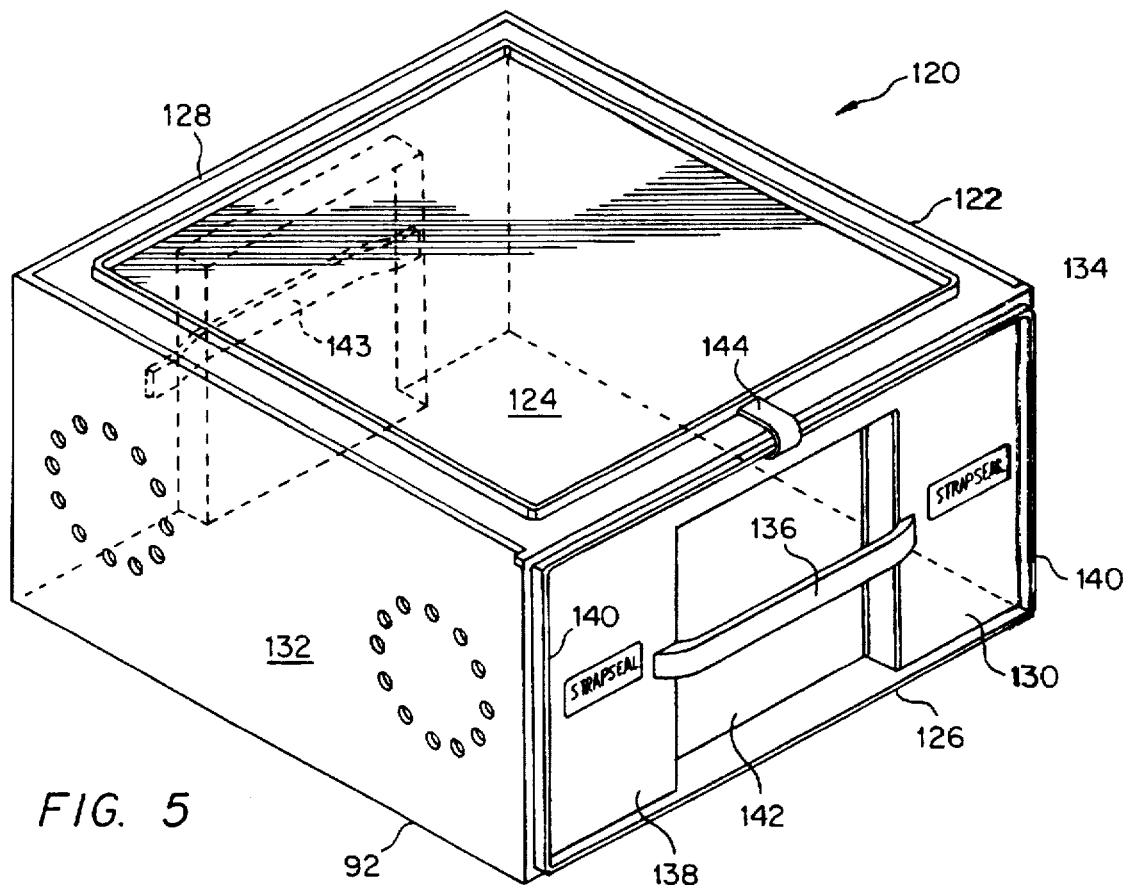
FIG. 5 shows a perspective view in elevation of another embodiment of the present multi-purpose container of the present invention having a pass core handle.

FIG. 5 shows an alternate configuration for the multi-purpose container of the present invention. Container 120 in FIG. 5 has container portion 122 and lid 124. Container portion 122 includes base 126, back 128, front 130, and sides 132 and 134. The thickness of lid 124, base 126, back 128, front 130, and sides 132 and 134 is generally-uniform throughout container portion 122. Container 120 is similar to container 10 of FIG. 1A with modifications to handle 136 and front 130.

Front 130 includes front panel 138 having raised front ridge 140 around the perimeter of front panel 138. Front panel 138 is slightly shorter than sides 132 and 134. Front panel 138 may have recess 142 formed in its central section. Spanning recess 142 is handle 136. Handle 136 is the type known as a pass core handle and can be grasped with a person's fingers. It is noted that handle 136 is below the surface of raised front ridge 140 so that front 130 of container 120 can mate with back 128 of another container 120. Handle 136 may be coupled to front panel 138 by heat staking, molding, form fixturing, or ultrasonically welding processes. FIG. 5 also shows handle 143 in back 128 (in dotted line format). Any of the configurations of the present multi-purpose container may, therefore, have two handles as shown in FIG. 5 for container 120.

FIG. 5 also illustrates tamper-proof mechanism 144. Tamper-proof mechanism 144 may have several embodiments. In its simplest form, it would be an adhesive strip that is placed over lid 124 and front 1q0. If tamper-proof mechanism 144 has been removed when container 120 reaches its destination, then the recipient of container 120 knows that container 120 has been opened. Alternatively, tamper-proof mechanism 144 could be a piece of plastic ultrasonically welded to lid 124 and front 130. This provides a hard fixed way to maintain container 120 closed and provides a high level of security that container 120 will not be opened during shipping or storage.

Figure 6:
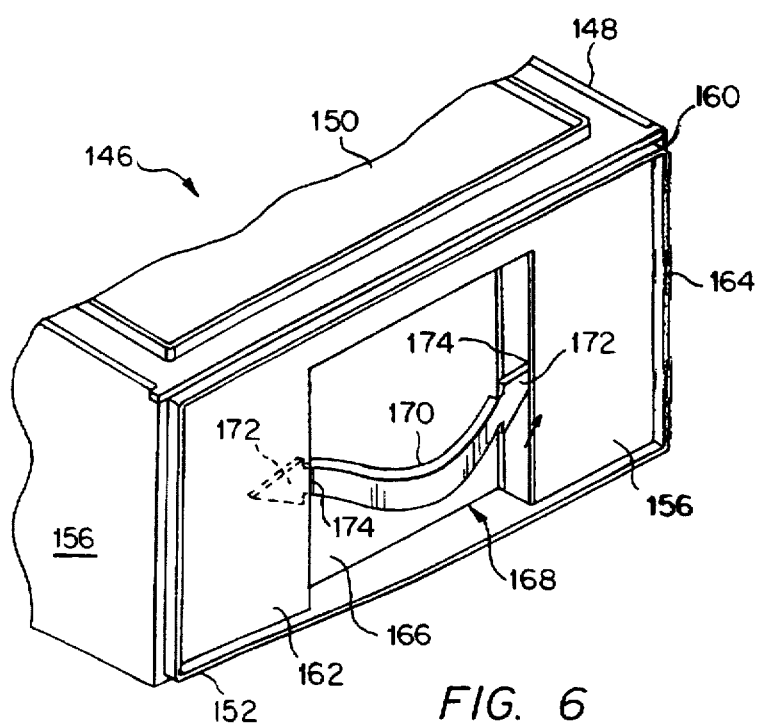
FIG. 6 illustrates a perspective view in elevation and in part of another embodiment of the multi-purpose container of the present invention having a barbed interlocking handle.

FIG. 6 shows a partial illustration of container 146 depicting an alternate configuration for the present multi-purpose container. container 146 includes container portion 148 and Sid 150. Container portion 148 includes base 152, front 156, and sides 158 and 160. The thickness of lid 1S0, base 1S2, front 156, and sides 158 and 160, is generally uniform throughout container portion 148.

Front 156 includes front panel 162 having raised front ridge 164 around the perimeter of front panel 162. Front panel 162 is slightly shorter than sides 1S8 and 160 and couples to base 1S2 and sides 158 and 160. Front panel 162 may have recess 166 formed in its central section. Within recess 166 may be handle 168. Handle 168 is the type known as an interlocking barbed handle and has handle body 170 with barbs 172 barbs 172 insert to openings 174 formed in recess 166 of front panel 162. When not in use, handle 168 will be stowed below raised front ridge 164 so that front 1S6 of container 146 can mate with back 1S4 of another container 146.

Figure 7:
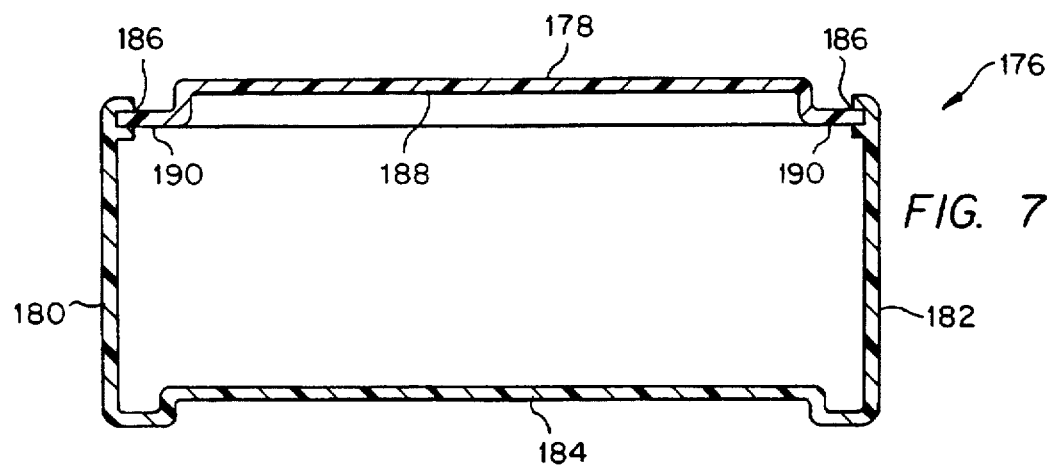
FIG. 7 depicts in cross section an alternate reversible lid configuration for the present multi-purpose container.

FIG. 7 shows an alternate configuration for the present multi-purpose container. Container 176 shown in FIG. 7 is shown in cross-section with lid 178, sides 180 and 182 and base 184. Sides 180 and 182 each include lid engagement channel 186. Lid 178 includes center section 188 with tab sections 190. Each tab section 190 is sized to be received in lid engagement channel 186. Lid 178 of container 176 is reversible in that it can be inserted with center section 188 above tab section 190 as shown in FIG. 1A or with center section 188 below tab sections 190. It may be desirable to use lid 178 as shown in FIG. 7 when container 176 is particularly full. Alternatively, when container 176 contains less than its full amount of materialS it may be desirable to stow lid 178 opposite to that shown in FIG. 7 so that the material within container 176 is not unnecessarily jostled during shipment and storage.

Figure 8:
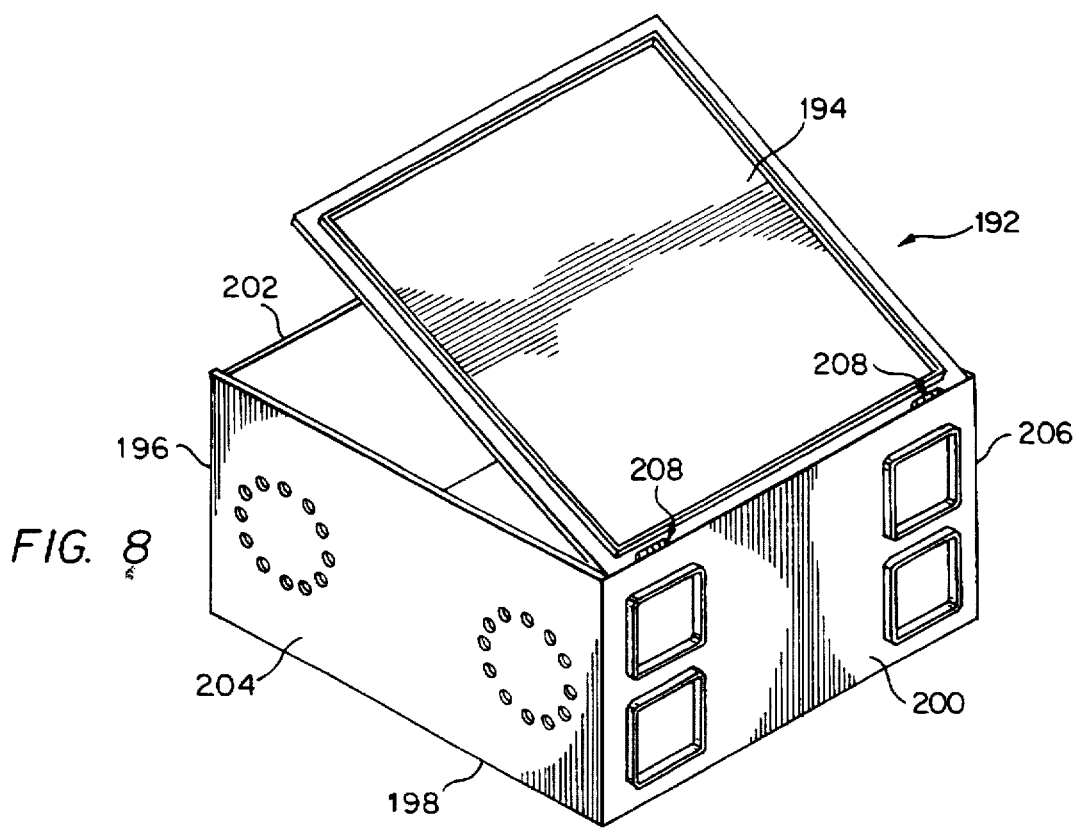
FIG. 8 shows a perspective view in elevation of another configuration of the present multi-purpose container having a hinged lid.

FIG. 8 shows multi-purpose container 192 embodying features of the present invention. Shipping container 192 has hingeable lid 194 and container portion 196. Container portion 196 includes base 198, back 200, front 202, and sides 204 and 206. The thickness of lid 194, front 202, back 200, front 202, and sides 204 and 206, is generally uniform throughout container portion 196.

FIG. 8 shows an alternate configuration for lid 194 of the present invention. Lid 194 is joined to container portion 196 by hinges 208. Container 192 of FIG. 9 provides a technical advantage of a one-piece container having lid 194 coupled directly to container portion 196.

Figure 9:
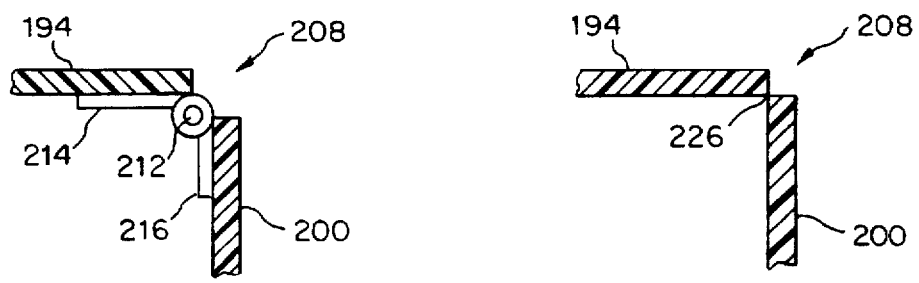
FIG. 9 depicts in cross section one embodiment for the hinge in the container of FIG. 8.

FIG. 9 shows a cross-sectional view of an embodiment for hinges 208 of container 192. Hinge 208 includes pivot joint 212, lid arm 214, and back arm 216. Pivot 212 may be formed from plastic that is attached to lid 194 and back 200 by known methods, such as, for example, ultrasonic welding.

Figure 10:
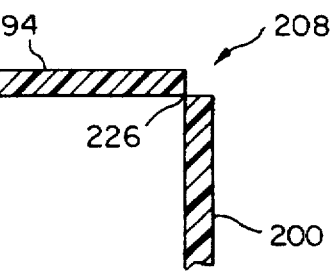
FIG. 10 shows in cross section another embodiment for the hinge in the container of FIG. 8.

FIG. 10 shows an alternate embodiment for hinge 208 of container 192 of FIG. 9. Hinge 208 in FIG. 10 is known to those skilled in the art as a living hinge and is formed from plastic that joins lid 194 to back 200. Living hinge 226 provides for a lid that is movable with respect to back 200, yet does not require the additional steps or expense of adding a physically separate hinge such as first hinge 210 or second 218 of FIG. 9.

The various embodiments of the present multi-purpose container can be made in a variety of sizes to accommodate a range of products including, but not limited to, plastic bags, produce, and other consumer goods. The size and shape of the present container can be modified as required for use with various items.

FIG. 11 illustrates shipping system 228 that is an application of the present container having multiple containers stacked onto and secured to shipping pallet 230. Shipping system 228 of FIG. 11 includes shipping pallet 230 that 4ss generally formed from wood, plastic, or other durable-material. Stacked on shipping pallet 230 are three columns 232 containing several of the multi-purpose containers of the present invention. The shipping containers on pallet 230 may be any of the embodiments shown and described herein for the present invention. In fact, several embodiments of the present multi-purpose container may be used at a time within shipping system 228. Each column 232 has several containers stacked face-to-back within a row and top-to bottom between rows. Columns 232 of multiple containers of the present invention are secured to pallet 230 by top plate 234, which may be cardboard, and straps 236. Alternatively, columns 232 of the present container may be secured to pallet 230 by plastic wrap as is known in the art. It is noted that because the present multi-purpose container interlocks with another container in both the top-to-bottom and front-to-back direction, that less plastic wrap is required than for prior art shipping containers.

FIG. 11 illustrates several technical advantages of the present invention. The multi-purpose container of the present invention can be used in shipping system 228 without requiring as much plastic wrap to secure the multiple containers to pallet 230. Reusable top plate 234 and straps 236 can be used in lieu of plastic wrap to secure the containers to pallet 230 minimizing refuse upon delivery of the containers. The present containers of shipping system 228 are interlocked within one another providing stability to shipping system 228. Additionally, once shipping system 228 reaches its destination, straps 236 and cardboard 234 can be removed and the material within the containers can be stored in the containers without requiring transfer to a new storage medium. This helps minimize the cost of the material shipped and stored within the container of the present invention. Additionally, the interlocking capability of the present multi-purpose container provides for more stable stacking as a product display for point-of-sale merchandizing of the material in the container.

FIG. 12 illustrates shipping system 238 that is an application of the present multi-purpose container having multiple containers interlocked with one another and stacked onto shipping pallet 230. Shipping system 238 of FIG. 12 includes shipping pallet 230, and stacked on pallet 230 are three rows 240 containing several of the multi-purpose containers of the present invention. The shipping containers on pallet 230 may be any of the embodiments shown and described herein for the present invention.

FIG. 12 demonstrates an alternate interlocking stacking scheme for the present multi-purpose container. Where shipping system 228 of FIG. 11 had three separate columns 232 of containers, rows 240 of shipping system 238 interlock with one another. Row 242 is interlocked with row 244 by ordering the containers in row 244 as shown with respect to the containers in row 242. Row 246 is similarly interlocked with row 244. FIG. 12, therefore, illustrates a shipping system where each multi-purpose container interlocks with more than one other similarly constructed container along any one face of the containers.

FIGS. 13–15 are perspective views of a reusable, multi-purpose plastic container (preferably clear), generally designated with reference numeral 310 and in accordance with a further preferred embodiment, which includes an open top container body 312 and a main lid 314 adapted to releasably attach to the open top 316. Main lid 314 is preferably formed with two pour openings 316a and 316b (FIG. 15A) and an auxiliary closure 318 is secured to the main lid 314 to open and close one or both openings in the unique manner described below.

Although container 310 may be sold as a single product, it is a highly preferred and unique feature of the present invention to fill container 310 with a second product A so that the container functions as packaging for the second product, as also described hereinabove in connection with the other preferred embodiments. The container 310 and product A are sold as a unit at a point of purchase display to a consumer having a need for both the reusable container as well as the product A. In the preferred embodiment, product A constitutes a roll or plurality of plastic trash bags 320 (FIGS. 15A and 15B only) disposed within the container interior 322, with the container 310 functioning as the packaging and shipping material. A label (not shown) describing product A as well as the independent, multi-purpose utility of the container 310 may be loosely placed or fixed within the container interior 322 for viewing through the transparent container side wall 324, or can be fixed to the container exterior. Following purchase, it is expected that the consumer will remove the plastic trash bags 320 from container body 312 by first removing main lid 314 to expose open top 316. Once this occurs, container 310 is now ready for immediate re-use as a container having a multi-purpose capability for storing and dispensing a variety of other materials, both liquid (e.g., juice, milk, etc.) and bulk material (e.g., cereal, nuts, raisins, etc.).

Another highly preferred feature of the present invention is to utilize reusable container 310 as packaging for a product A that is predominantly made from the same type of material as the container body 312 and/or lid 314. Preferably, but not necessarily, a plastics product manufacturer that manufactures both plastic containers and plastic garbage bags (or other plastic products) as also described hereinabove in connection with the other preferred embodiments, or that manufactures one and has the capability to manufacture the other, will find that practice of the invention advantageously results in enjoyment of certain economies, i.e., use of one manufactured product having separate and independent multi-purpose utility as packaging material for the second product, thereby eliminating the need to manufacture or acquire separate packaging material for the second product.

Another highly preferred feature of the present invention is that reusable container 310 and the other preferred embodiments hereinabove are designed for multi-functional use which is separate and independent from its use as packaging material for product A. The feature of re-attachable main lid 314 is important for imparting multi-functional characteristics to container 310. In this context, invention extends to the combination of container 310, inclusive of lid 314, irrespective of the nature of product A. However, it is preferred that product A be a dry bulk material (e.g., raisins, almonds, screws, candy, cereal, etc.) as opposed to a liquid material (e.g., juice) when initially packaged within container 310 for sale as a unit.

It is contemplated that reusable, multi-purpose container 310, when initially filled with product A in fulfillment of its new packaging function, will be sold as a packaged array 325 as depicted in FIG. 15B, wherein a plurality of identical filled containers 310 are disposed in a two-dimensional grouping of side-by-side arrays, held together with a wrapping material, such as strapping 327 and/or plastic film 329 wrapped around the entire grouping. Preferably, it may be advantageous to use as wrapping material 327 or 329 a material that is also made from the same type of material as the container body 312 and/or lid 314.

In accordance with another feature of the present invention, each main lid 314 is formed with a pair of locking tabs 330 respectively formed on two of the vertically extending side wall portions 332a and 332c (FIGS. 18A–18G of the lid, and a pair of locking recesses 331 respectively formed on a different pair of vertically extending side wall portions 332b and 332c of the lid. The tabs 330 extend in mutually perpendicular planes P1 and P2 (FIG. 18A only) and the recesses 331 also extend in mutually perpendicular planes P3 and P4 that are respectively parallel to the first set of planes P2,P1. This arrangement of locking tabs 330 and recesses 331 advantageously allows the adjacent containers 310 in the two-dimensional grouping 325 to interlock with each other and impart a rigidity and stability to the packaged structure.

Although the foregoing features and advantages of the FIG. 13 embodiment of the present invention will now be described for preferred use with reusable container 310, it will be appreciated by one of ordinary skill in the art that the principles of the invention extend to use with other types of reusable containers, including those disclosed in the FIG. 1-12 embodiments discussed hereinabove.

Referring now to the particular structure of container 310, the container body 312 (see FIGS. 17A–17G) includes a bottom wall 334 formed with nestable and stackable formations 336 designed to interfit with the main lid 314 of an adjacent below container in a stacking configuration, and a perimetric side wall 338 extending upwardly from the bottom wall to create a leak proof container body. The side wall 338 can be generally octagonal in plan view (see, e.g., FIG. 17D), or have another polygonal or curvilinear shape, with two elongated side wall portions 338a,338b respectively interconnected with six shorter side wall portions 338c, 338d, 338e, 338f, 338g and 338h. The elongated and shorter side wall portions 338a–338h are preferably tapered in the direction of the bottom wall 334, as best seen in FIGS. 17A–17C, to facilitate nesting empty containers. Four or the six shorter side wall portions 338c–338h are diagonal webs 338c, 338e, 338f and 338h which are respectively located immediately adjacent the opposite side edges of the elongated side wall portions 338a,338b. To facilitate manual gripping, each web 338c,338e,338f,338h is formed with a first longitudinal finger gripping recess 340 in the exterior surface thereof extending from the container bottom wall 334 for approximately two-thirds the height of the container body 312. The remaining two shorter side wall portions 338d,338g are disposed respectively inbetween a pair of the diagonal webs, and are each formed with a second longitudinal recess 342 in the exterior surface thereof, extending from the container bottom wall 334 along most of the container height. Each second longitudinal recess 342 also performs a finger-gripping function while facilitating sliding of an empty inner nested container outwardly from the empty outer container (not shown) because the contact wall surface area is reduced between the two nested containers, lowering resistance to such sliding movement.

As best depicted in FIGS. 16A and 16B, the side wall portions 338d and 338g may be respectively formed with English system gradations, and metric gradations to facilitate multi-functional use of the container 310 for dispensing accurate predetermined quantities of the product from the container.

Figure 19E:
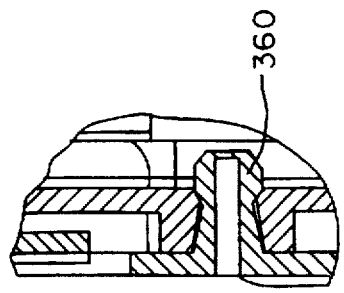
FIG. 19E is a detailed view depicting the method of hinge attachment of the auxiliary closure to the main lid.
Figure 19B:
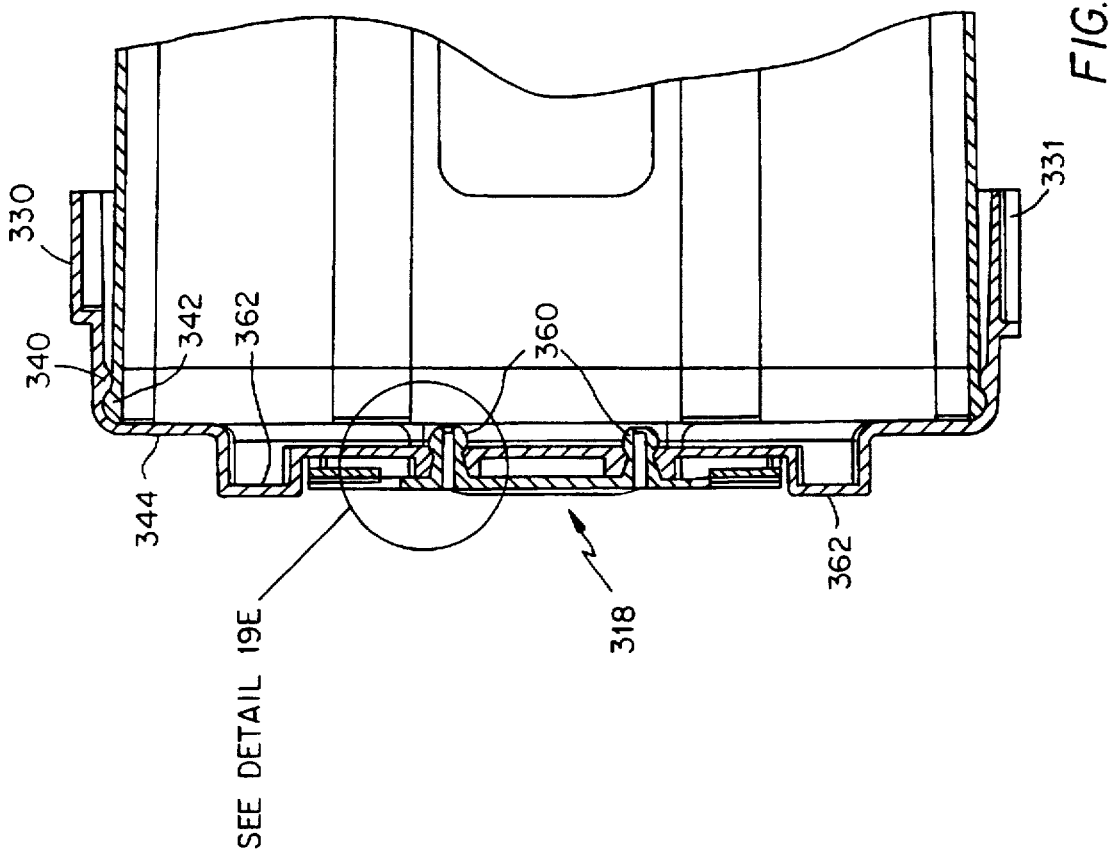
FIG. 19B is a sectional view taken along the line 19B—19B of FIG. 19C.

Referring now to FIGS. 18A–18G, the main lid 314 includes a top wall 344 and a perimetric side wall which, in the preferred embodiment, includes eight side wall portions 332a, 332b, 332c, 332d, 332e, 332f, 332g and 332h adapted to interfit over the uppermost edges 16 of the container side wall portions 338a–338h. The lid side walls 332a–332h are formed with an inner rib 340 on an inward facing surface thereof (see, e.g., FIG. 18E) which is adapted to slide over an exterior bead 342 formed in the upper edge of the container side wall portions, in snap-fitting engagement, to sealingly secure the main lid 314 to the container body 312 as best depicted in FIGS. 19A and 19B.

Details of the male and female locking formations 330, 331 are respectively depicted in FIGS. 18D and 18G. In the preferred embodiment, the male locking tab 330 is formed with an exterior annular recess 330' adapted to snap-fittingly engage an internal annular rib 331' in the female recess 331 of a lid 314 in an adjacent container 310' (FIG. 15B) to ensure secure locking retention.

Reference is now made to FIG. 18C, wherein the longer elongated lid side wall portions 332a,332d (adapted to interfit over the container elongated side wall portions 338a,338b) are shown disposed at the 12:00 and 6:00 positions (for reference purposes only) in a top plan view of the lid. In this frame of reference, the lid top wall 344 is formed with a circular upstanding wall 350 (FIG. 18B) defining the circular opening 316a in the 9:00 position through which container contents may be dispensed. The top wall 344 also includes the second pour opening 316b in the 3:00 position, formed by three upstanding walls 352a, 352b and 352c defining three sides of a rectangle, with the fourth longitudinal side replaced with a trapezoidal shaped side wall 352d, 352e and 352f in an outboard region of the lid 314. A pair of hinge openings 356 are punched through the top wall 344 to define a hinge axis 358 extending in the 6:00 to 12:00 direction, into which hinge connecting formations 360 of the auxiliary closure 318 sealingly interfit to connect the closure to the lid top wall 344 as best depicted in FIG. 19B.

Still with reference to FIG. 18C, the top wall 344 further includes a pair of upstanding trapezoidal formations 362 extending parallel to the elongated lid side portions 332a, 332d at the 6:00 and 12:00 positions, respectively. The upstanding base 362a of each trapezoidal formation 362 serves to positively locate the auxiliary closure 318 for ease of reattachment to the main lid top wall 344 at hinge openings 356. Additionally, the three outboard vertical surfaces (i.e., the trapezoid side edges 362b,362c and the trapezoid top edge 362d) are advantageously designed to interfit within the bottom wall 334 of the container body 312 to achieve a stable stacking formation. As discussed briefly above in connection with FIGS. 17A and 17C, the molded container body bottom wall 334 has the inward facing vertical surfaces 336 designed to slidably and preferably snugly fit over the trapezoidal stacking formations 362 of an adjacent below container in positive interlocking stacking engagement, with the manual pull tabs 382 of the auxiliary closure 318 on the associated lid 314 of the lower stacked container projecting outward elevationally beneath second recess 342 of the upper container.

The auxiliary closure 318, as best depicted in FIGS. 20A–20D, is formed with a center hinge portion 370 from which the hinge connecting formations 360 project to connect the closure to the lid top wall 344. Opposite ends 372 and 374 of the closure 318 are respectively interconnected to opposing sides of the hinge portion 370 through respective pairs of vertically spaced, inner connecting webs 376 (best depicted in FIG. 20A) extending the width of the closure. It will be appreciated that a respective pair of connecting webs 376 creates a flexure zone about which the associated closure ends 372 or 374 pivot into and out of sealing closing contact with its associated pour opening 316a,316b, respectively. In addition, webs 376 may be replaced with a thin wall relative to the thickness of the closure ends.

More specifically, the bottom surface of one closure end 372 is formed with a cylindrical upstanding wall 378 (FIGS. 15 and 20A) designed to sealingly interfit within and against the circular wall 350 defining the circular opening 316a within the main lid 314 (FIG. 18C). The bottom surface of the other closure end 374 is formed with an upstanding wall 380 (also FIGS. 15A and 20A) circumscribing a trapezoid so as to sealingly interfit within and against the correspondingly shaped rectangular and trapezoidal walls 352a–352f defining the larger pour opening 316b within the main lid 314.

With both closure end portions 372,374 sealingly secured to cover its respective hole 316a,316b, one of the end portions can be unsecured from its hole by grasping the manual pull tab 382 to lift the closure end in pivoting movement about the hinge axis 358. Preferably, but not necessarily, the other closure end portion remains secured to cover its respective hole. Once contents are dispensed, the unsecured closure end portion is snap-it secured back into sealing contact with the associated pour opening.

It will be appreciated that the above described component parts of container 310 may be molded from a plastic material such as polypropylene. Other types of materials and plastics may also be used as deemed appropriate. Preferably, materials that are dishwasher safe or usable for microwave preparation or heating of foods can be used. Furthermore, as mentioned briefly above, the container shape may be modified to provide for different other types of reusable and multi-purpose container functions within the spirit of the invention as described hereinabove and as embodied in the claims below.

Additionally, although in this preferred embodiment the main lid 314 and auxiliary closure 318 are disclosed as providing liquid snap-fitting seals between each other, it will be appreciated that, in certain applications such as pertaining exclusively to the storage of dry goods, the aforementioned seals need not necessarily be liquid seals. Thus, the term "seal" or "sealing" or "sealingly" as used in the present specification and claims does not necessarily limit the claims to the use of liquid seals.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In combination; comprising:
   (a) a reusable plastic container; and
   (b) a product including a plurality of plastic garbage bags disposed within said reusable container, wherein said reusable plastic container includes a container label associated with the container and having indicia representative of a description of the product, said container thereby functions as packaging and shipping material for said plastic garbage bags, said container, label and said bags thereby being saleable as a unit at a point of purchase;
   wherein said reusable plastic container includes a container body; a main lid detachably secured to close an open end of the container body, said main lid being formed with at least one pour opening; and an auxiliary closure secured to the main lid to selectively cover said pour opening.

2. In combination; comprising:
   (a) a reusable plastic container; and
   (b) a product including a plurality of plastic garbage bags disposed within said reusable container, wherein said reusable plastic container includes a container label associated with the container and having indicia representative of a description of the product, said container thereby functions as packaging and shipping material for said plastic garbage bags, said container, label and said bags thereby being saleable as a unit at a point of purchase;
   wherein said reusable plastic container includes a container body; a main lid detachably secured to close an open end of the container body, said main lid being formed with at least one pour opening; and an auxiliary closure secured to the main lid to selectively cover said pour opening;
   wherein said main lid includes first and second pour openings spaced from each other, wherein said auxiliary closure includes a pair of closure portions at opposite ends thereof and a hinge portion at a center location, means for connecting said hinge portion to said main lid, whereby said closure portions are independently manually pivotable into and out of closing contact with an associated said pour opening.

3. In combination; comprising:
   (a) a reusable plastic container; and
   (b) a product including a plurality of plastic garbage bags disposed within said reusable container, wherein said reusable plastic container includes a container label associated with the container and having indicia representative of a description of the product, said container thereby functions as packaging and shipping material for said plastic garbage bags, said container, label and said bags thereby being saleable as a unit at a point of purchase;
   wherein said reusable plastic container includes a container body; a main lid detachably secured to close an open end of the container body, said main lid being formed with at least one pour opening; and an auxiliary closure secured to the main lid to selectively cover said pour opening;
   wherein said main lid includes first and second pour openings spaced from each other, wherein said auxiliary closure includes a pair of closure portions at opposite ends thereof and a hinge portion at a center location, means for connecting said hinge portion to said main lid, whereby said closure portions are independently manually pivotable into and out of closing contact with an associated said pour opening;
   wherein said hinge portion has thin connecting web portions connecting the hinge to said closure portions of greater thickness than said web portions, said web portions thereby defining flexure zones about which the closure portions pivot relative to the hinge portion.

4. In combination; comprising:
   (a) a reusable plastic container; and
   (b) a product including a plurality of plastic garbage bags disposed within said reusable container, wherein said reusable plastic container includes a container label associated with the container and having indicia representative of a description of the product, said container thereby functions as packaging and shipping material for said plastic garbage bags, said container, label and said bags thereby being saleable as a unit at a point of purchase;
   wherein said reusable plastic container includes a container body; a main lid detachably secured to close an open end of the container body, said main lid being formed with at least one pour opening; and an auxiliary closure secured to the main lid to selectively cover said pour opening;
   further comprising a locking tab formed on a side wall portion of at least one of the main lid and container body, and a locking recess formed on another side wall portion of at least one of the main lid and container body, whereby mating engagement of a locking tab of one said reusable plastic container within a locking recess of another said reusable plastic container enables adjacent containers to interlock in side-by-side display and to provide shipping stability.

5. In combination; comprising:
   (a) a reusable plastic container; and
   (b) a product including a plurality of plastic garbage bags disposed within said reusable container, wherein said reusable plastic container includes a container label associated with the container and having indicia representative of a description of the product, said container thereby functions as packaging and shipping material for said plastic garbage bags, said container, label and said bags thereby being saleable as a unit at a point of purchase;
   wherein said reusable plastic container includes a container body; a main lid detachably secured to close an open end of the container body, said main lid being formed with at least one pour opening; and an auxiliary closure secured to the main lid to selectively cover said pour opening;
   further comprising a locking tab formed on a side wall portion of at least one of the main lid and container body, and a locking recess formed on another side wall portion of at least one of the main lid and container body, whereby mating engagement of a locking tab of one said reusable plastic container within a locking recess of another said reusable elastic container enables adjacent containers to interlock in side-by-side display and to provide shipping stability;

wherein said locking tab and locking recess are provided with ribbed formations to enable snap-fitting interconnection.

6. In combination; comprising:

(a) a reusable plastic container including an open top container body and a main lid reattachably secured to selectively close the open top and define a liquid tight seal; and (b) a dry product disposed within said reusable container;

(c) a label operatively connected to the container and having indicia representative of the description of the dry product package within the container;

wherein said reusable plastic container constitutes packaging for said dry product, said container, label and said product thereby being saleable as a unit at a point of purchase;

wherein said dry products are plural garbage bags.

7. A method of packaging a product, comprising the steps of:

(a) packaging said product within a reusable plastic container formed with a liquid tight closure lid and functioning as the packaging for said product; and (b) selling the reusable container and said second product as a unit at a point of purchase;

whereby said container is reusable as a multi-functional container after both are purchased and said product is removed or dispensed from the container;

wherein said products are plastic trash bags.

8. In combination, comprising:

(a) a reusable plastic container including a lid removably mounted to said container to form a liquid tight closure; and (b) plastic goods disposed within said reusable container, wherein said reusable container functions as packaging and shipping material for said plastic goods, both said container and plastic goods thereby being saleable as a unit at a point of purchase, wherein said plastic goods constitutes a plurality of plastic garbage bags.

* * * * *